(12) United States Patent
Cummings et al.

(10) Patent No.: US 8,189,101 B2
(45) Date of Patent: May 29, 2012

(54) DATA CONNECTOR FOR AN ELECTRONICS DEVICE

(75) Inventors: Greg Allen Cummings, San Francisco, CA (US); John Louis Warpakowski Furlan, Belmont, CA (US); Jaewon Samuel Kang, Santa Clara, CA (US); Lionel Jingles, San Francisco, CA (US); Maarten Dinger, San Francisco, CA (US); Nasahn Adam Sheppard, Mill Valley, CA (US); Peter Michaelian, Tappan, NY (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 12/258,329

(22) Filed: Oct. 24, 2008

(65) Prior Publication Data

US 2009/0109329 A1    Apr. 30, 2009

Related U.S. Application Data

(60) Provisional application No. 60/983,121, filed on Oct. 26, 2007.

(51) Int. Cl.
*H04N 5/225* (2006.01)
*H01R 13/44* (2006.01)
(52) U.S. Cl. ........................................ 348/376; 439/135
(58) Field of Classification Search ................. 348/374, 348/376, 207.99, 333.07, 333.06, 207.1, 348/373
See application file for complete search history.

(56) References Cited

U.S. PATENT DOCUMENTS

| 3,001,461 | A | 9/1961 | Irwin |
| D296,551 | S | 7/1988 | Mizogui |
| D384,964 | S | 10/1997 | Ito et al. |
| D401,257 | S | 11/1998 | Iino |
| 6,129,572 | A | 10/2000 | Feldman et al. |
| D463,426 | S | 9/2002 | Cheng |
| 6,449,438 | B1 | 9/2002 | Gennetten |
| D464,664 | S | 10/2002 | Huang |
| 6,477,138 | B1 | 11/2002 | Cho et al. |

(Continued)

FOREIGN PATENT DOCUMENTS

CN    2 738 529    11/2005

(Continued)

OTHER PUBLICATIONS

Office Action, U.S. Appl. No. 29/327,559. Dated Apr. 28, 2009.

(Continued)

*Primary Examiner* — David Ometz
*Assistant Examiner* — Ahmed A Berhan
(74) *Attorney, Agent, or Firm* — Patterson & Sheridan, LLP

(57) ABSTRACT

One embodiment of the invention sets forth a hand-held electronics device for recording digital video that includes a housing, a processor disposed within the housing, and a data connector coupled to the processor such that data can be transmitted to and from the processor through the data connector. The data connector includes an arm rotationally coupled to the housing, and an adapter portion matable with a corresponding adapter of a computer system. The data connector forms a portion of a top part or a bottom part of the housing when in a retracted position. Among other things, the disclosed hand-held electronics device advantageously enables a user to easily, with one hand, hold the hand-held electronics device and slide the trigger with a thumb or other finger to release the data connector into the extended position.

20 Claims, 12 Drawing Sheets

U.S. PATENT DOCUMENTS

| | | | |
|---|---|---|---|
| D467,259 S | 12/2002 | Hung et al. |
| 6,577,337 B1 | 6/2003 | Kang |
| 6,587,151 B1 | 7/2003 | Cipolla et al. |
| 6,628,325 B1 | 9/2003 | Steinberg et al. |
| D482,694 S | 11/2003 | Chen |
| D487,458 S | 3/2004 | Gentil et al. |
| 6,720,998 B1 | 4/2004 | Kim |
| 6,727,952 B1 | 4/2004 | Hirata et al. |
| 6,731,956 B2 | 5/2004 | Hanna et al. |
| 6,743,030 B2 | 6/2004 | Lin et al. |
| 6,750,902 B1 | 6/2004 | Steinberg et al. |
| 6,773,192 B1 * | 8/2004 | Chao | 401/195 |
| 6,784,941 B1 | 8/2004 | Su et al. |
| 6,806,978 B1 | 10/2004 | Tamura et al. |
| 6,808,400 B2 * | 10/2004 | Tu | 439/131 |
| 6,819,355 B1 | 11/2004 | Niikawa |
| 6,829,004 B1 | 12/2004 | Abe |
| 6,833,863 B1 | 12/2004 | Clemens |
| 6,873,356 B1 | 3/2005 | Kanbe et al. |
| 6,941,021 B2 | 9/2005 | Goldstein et al. |
| 6,950,142 B2 | 9/2005 | Soumi et al. |
| 6,979,210 B2 | 12/2005 | Regen et al. |
| 6,992,721 B1 | 1/2006 | Kambayashi et al. |
| 7,004,780 B1 | 2/2006 | Wang |
| 7,025,275 B2 * | 4/2006 | Huang et al. | 235/486 |
| 7,070,425 B2 | 7/2006 | Regen et al. |
| 7,090,515 B2 | 8/2006 | Regen et al. |
| 7,125,265 B2 * | 10/2006 | Weng | 439/131 |
| 7,126,629 B1 | 10/2006 | Braunstein et al. |
| D531,581 S | 11/2006 | Wang et al. |
| 7,142,244 B1 | 11/2006 | Barbeau |
| D552,141 S | 10/2007 | Kaplan et al. |
| 7,286,182 B2 | 10/2007 | Silverbrook et al. |
| 7,286,256 B2 | 10/2007 | Herbert |
| 7,349,010 B2 | 3/2008 | Bryant et al. |
| 7,359,003 B1 * | 4/2008 | Knighton et al. | 348/376 |
| 7,385,630 B2 | 6/2008 | King et al. |
| 7,389,878 B1 | 6/2008 | Torrico |
| D577,019 S | 9/2008 | Udagawa et al. |
| 7,443,418 B2 | 10/2008 | Bryant et al. |
| D579,933 S | 11/2008 | Deguchi |
| 7,462,044 B1 | 12/2008 | Regen et al. |
| 7,566,231 B2 | 7/2009 | Regen et al. |
| 2002/0101515 A1 | 8/2002 | Yoshida et al. |
| 2003/0207611 A1 | 11/2003 | Lin et al. |
| 2003/0227551 A1 | 12/2003 | Kudo |
| 2004/0077216 A1 | 4/2004 | Tu |
| 2004/0145676 A1 | 7/2004 | Lin |
| 2004/0155966 A1 | 8/2004 | Jang et al. |
| 2004/0201692 A1 | 10/2004 | Parulski et al. |
| 2004/0212966 A1 | 10/2004 | Fisher et al. |
| 2004/0263634 A1 | 12/2004 | Kiuchi |
| 2005/0037647 A1 | 2/2005 | Le |
| 2005/0050371 A1 | 3/2005 | Ono |
| 2005/0060636 A1 | 3/2005 | Mathe |
| 2005/0070225 A1 | 3/2005 | Lee |
| 2005/0079738 A1 | 4/2005 | Ahn |
| 2005/0099499 A1 | 5/2005 | Braunstein et al. |
| 2005/0114587 A1 | 5/2005 | Chou et al. |
| 2005/0157459 A1 | 7/2005 | Yin et al. |
| 2005/0161513 A1 * | 7/2005 | Huang et al. | 235/492 |
| 2005/0162508 A1 | 7/2005 | Basmadijian et al. |
| 2005/0174710 A1 | 8/2005 | Masui et al. |
| 2005/0177661 A1 | 8/2005 | Loo |
| 2005/0210195 A1 | 9/2005 | Teicher et al. |
| 2005/0237356 A1 | 10/2005 | Lee |
| 2005/0237398 A1 | 10/2005 | Fujii et al. |
| 2005/0253930 A1 | 11/2005 | Endo et al. |
| 2005/0265099 A1 | 12/2005 | Hosokawa |
| 2005/0280732 A1 | 12/2005 | Misawa |
| 2005/0285963 A1 | 12/2005 | Misawa et al. |
| 2006/0015662 A1 | 1/2006 | Dietz et al. |
| 2006/0036784 A1 | 2/2006 | Loo |
| 2006/0064185 A1 | 3/2006 | Yeh |
| 2006/0075411 A1 | 4/2006 | Yeh |
| 2006/0092302 A1 | 5/2006 | Lee |
| 2006/0103737 A1 | 5/2006 | Okisu et al. |
| 2006/0109349 A1 | 5/2006 | Takashima |
| 2006/0216973 A1 | 9/2006 | Walmsley et al. |
| 2006/0223369 A1 | 10/2006 | Zheng |
| 2007/0022232 A1 * | 1/2007 | Bhakta et al. | 710/62 |
| 2007/0066130 A1 | 3/2007 | Mori et al. |
| 2007/0093093 A1 | 4/2007 | Lev et al. |
| 2007/0242066 A1 | 10/2007 | Levy Rosenthal |
| 2008/0014829 A1 | 1/2008 | Dyer et al. |

FOREIGN PATENT DOCUMENTS

| | | |
|---|---|---|
| GB | 2 433 845 | 7/2007 |

OTHER PUBLICATIONS

Office Action, U.S. Appl. No. 29/328,155, dated Jun. 24, 2009.
Benderoff, Eric. "This Videocam is Easy to Keep at Fingertips," Chicago Tribune, May 17, 2006.
Colker, David. "Gizmo Report: Small Device Creates Instant Video," Los Angeles Times, May 26, 2006.
Graham, Jefferson. "New breed of tiny camcorder simple to use, easy on wallet," USA Today, May 1, 2006.
Mossberg, et al. "The Video Camera Revised," Wall Street Journal, May 3, 2006.
Pure Digital "Point and Shoot" Camcorder, released May 1, 2006 (pp. 1-7).
Pure Digital Flip Video Ultra Series, released Sep. 12, 2007 (pp. 1-7).
Pure Digital Flip Video, released May 1, 2007 (1 page).
U.S. Appl. No. 11/497,039, filed Jul. 31, 2006.
Office Action. U.S. Appl. No. 29/328,155. dtd. Jun. 24, 2009.
European Supplementary Search Report, EP 08 84 1117 mailed Dec. 14, 2010.
International Search Report. Dec. 24, 2008.

* cited by examiner

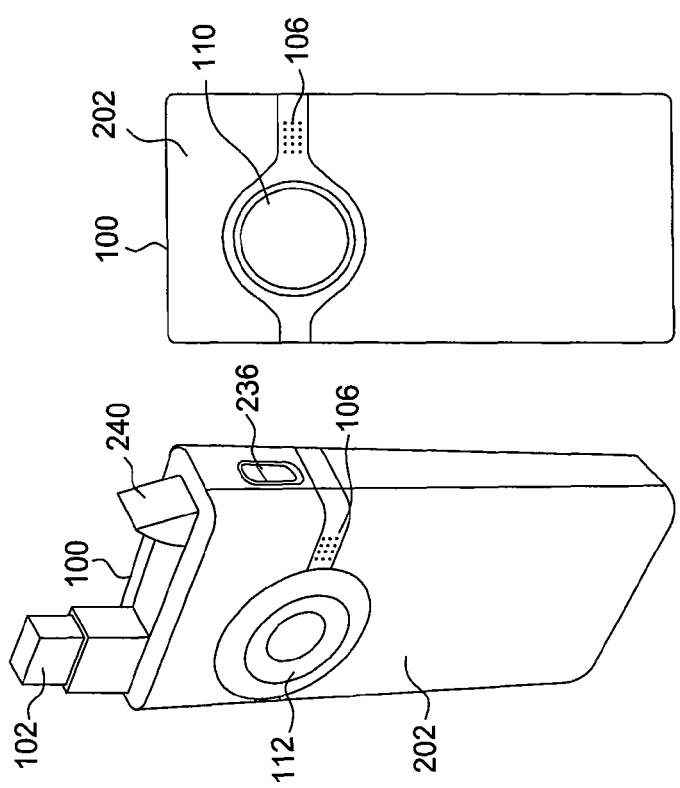

STAGE 2

STAGE 1

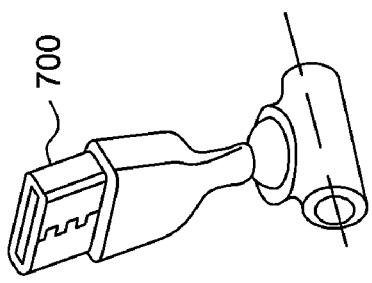
FIG. 7A
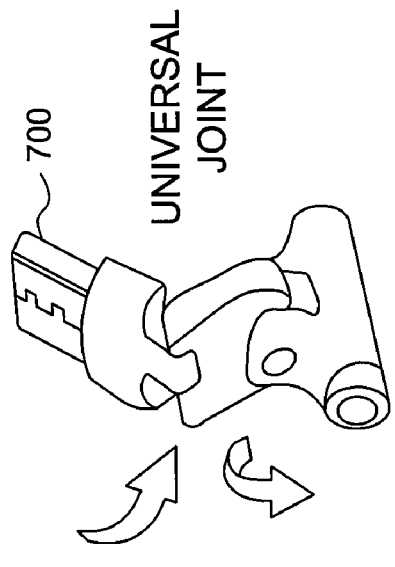
FIG. 7B
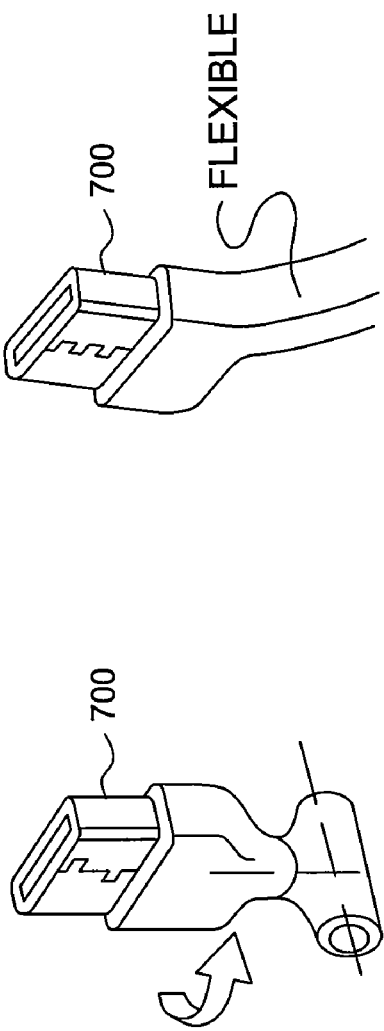
FIG. 7C
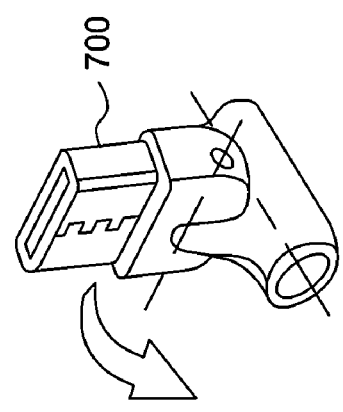
FIG. 7D
FIG. 7E

DATA CONNECTOR FOR AN ELECTRONICS DEVICE

CROSS-REFERENCE TO RELATED APPLICATIONS

This application claims the priority benefit of provisional U.S. Patent Application Ser. No. 60/983,121, filed Oct. 26, 2007, the subject matter of which is hereby incorporated by reference.

BACKGROUND OF THE INVENTION

1. Field of the Invention

The invention relates generally to hand-held electronics devices and, more specifically, to a data connector for a hand-held electronics device.

2. Description of the Related Art

Digital video camera (DVC) technology has developed rapidly over the past decade. A broad variety of DVCs are now available to meet the diverse needs of a wide spectrum of consumers. DVC technology provides a user with a convenient device that records video and audio and also provides the ability to transfer the recorded video and audio to a computer-readable medium. The computer-readable medium may be, for example, a Digital Video Disc (DVD) or a computer memory.

A DVC user typically records video and audio by activating a recording mode of the DVC and pointing the lens of the DVC towards an area of interest to record the subject matter in that area. Other operating modes include, without limitation, replaying recorded video, deleting saved videos, increasing the volume of the audio, and zooming in or out. The DVC user typically selects the different modes by manipulating a set of interface buttons located on the DVC. The interface buttons typically corresponds to a graphical user interface (GUI) that is displayed on a view screen.

Once video and audio data is recorded on the DVC, the data may be transferred to a computer memory via a cord or connector that couples the DVC to a computer or output to a television (TV). Common types of connectors provided with DVCs are universal serial bus (USB) connectors, firewire connectors, High-Definition Multimedia Interface (HDMI) connectors, proprietary connectors, or other types of connectors that may be used to transfer data. Some DVCs may include a cord that connects the DVC to the computer; whereas, other DVCs may include a connector that protrudes from the DVC and can be plugged directly into a computer.

One problem encountered by users involves transferring video and audio data from the DVC to a computer and/or outputting the video and audio to a TV. External cords are often too short or too long to be used easily. Also, having an additional external cord reduces the portability of the DVC. Integrated connectors, while eliminating the external cord, generally cause the DVC to dangle precariously from the computer or the TV to which the DVC is connected, which can place damaging stress on the integrated connector.

Accordingly, there remains a need in the art for a digital video camera that provides a simple way to record digital video and audio and to transfer the recorded data to a computer.

SUMMARY OF THE INVENTION

One embodiment of the invention sets forth a hand-held electronics device for recording digital video. The hand-held electronics device includes a housing, a processor disposed within the housing, and a data connector coupled to the processor such that data can be transmitted to and from the processor through the data connector. The data connector includes an arm rotationally coupled to the housing, and an adapter portion matable with a corresponding adapter of a computer system. The data connector forms a portion of a top part or a bottom part of the housing when in a retracted position.

One advantage of the disclosed hand-held electronics device is that the user can easily, with one hand, hold the hand-held electronics device and slide the trigger with a thumb or other finger to release the data connector into the extended position. Because the data connector is designed to extend from the top or bottom portion of the hand-held electronics device (and not from the side), the user's hand does not interfere with the release of the data connector. Further, since the data connector extends from the top of the hand-held electronics device, the user can easily slide the extended data connector into a corresponding port on a computer system without having to rotate the device awkwardly in his/her hand or contort his/her hand to align the data connector with the computer system port.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is an isometric view of the hand-held device, according to one embodiment of the invention.

FIG. 2B is a front view of the hand-held device, according to one embodiment of the invention.

FIG. 2C is a back view of the hand-held device, according to one embodiment of the invention.

FIG. 2D is a left-side view of the hand-held device, according to one embodiment of the invention.

FIG. 2E is a right-side view of the hand-held device, according to one embodiment of the invention.

FIG. 2F is a top view of the hand-held device, according to one embodiment of the invention.

FIG. 2G is a bottom view of the hand-held device, according to one embodiment of the invention.

FIGS. 7A-7E illustrate different data connector designs, according to various alternative embodiments of the invention.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
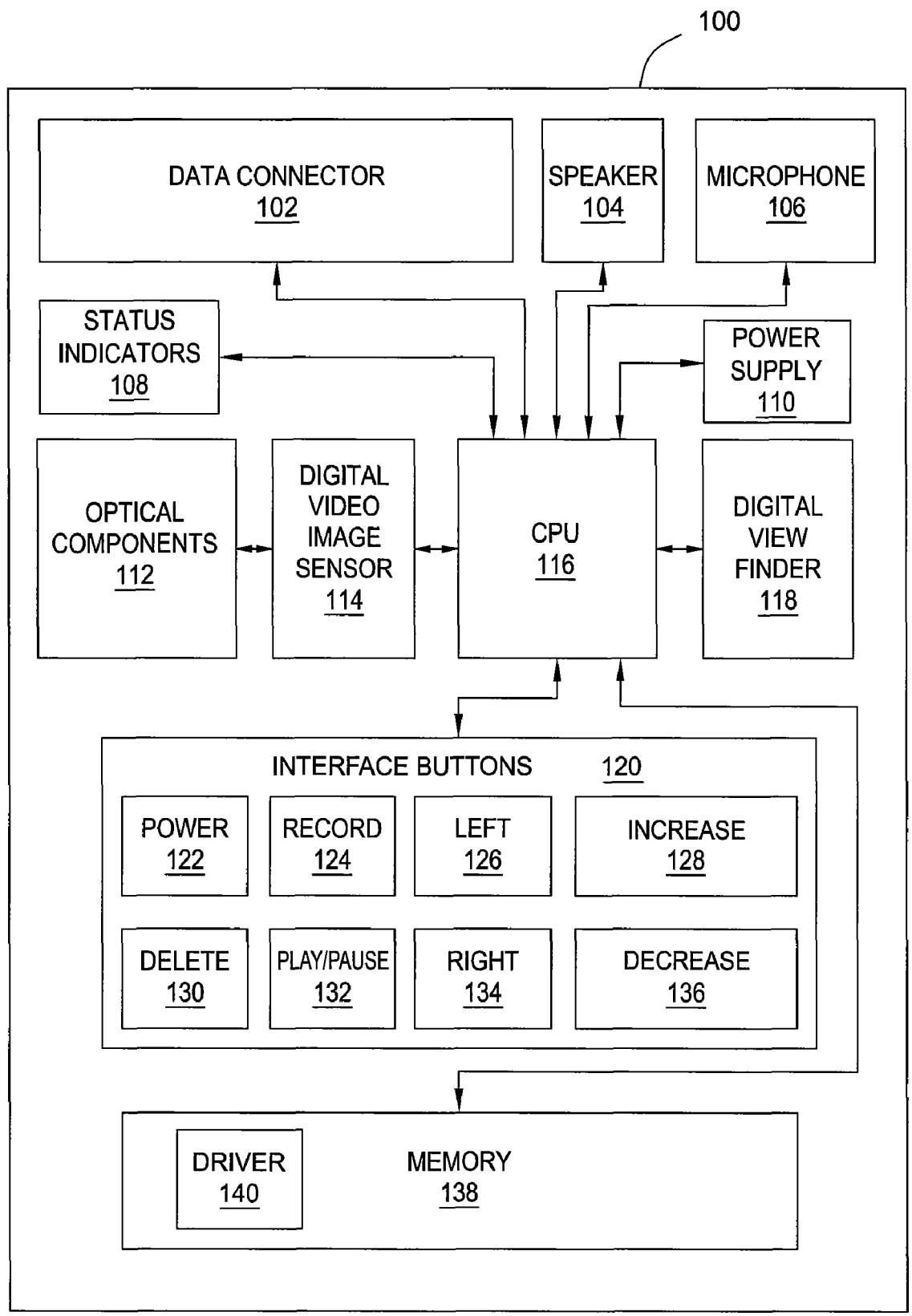
FIG. 1 is a block diagram of a hand-held device configured to implement one or more aspects of the invention.

FIG. 1 is a block diagram of a hand-held device (HHD) 100 configured to implement one or more aspects of the invention. As shown, the HHD 100 includes, without limitation, a data connector 102, a speaker 104, a microphone 106, status indicators 108, a power supply 110, optical components 112, a digital video image sensor 114, a central processing unit (CPU) 116, a digital viewfinder 118, interface buttons 120, and an internal memory 138. In one embodiment, the HHD 100 is a digital video camera.

As described in greater detail herein, the data connector 102 is an integrated mechanism that allows the HHD 100 to be connected with a separate TV or computer system, such as laptop or a desktop computer, and to transfer data to and from the computer system and/or output video and audio to the TV. The data connector 102 may be a universal serial bus (USB) connector, a firewire connector, an HDMI connector, a serial connector, or another type of connector that is capable of connecting the HHD 100 with the TV or the computer system.

When in record mode, the HHD 100 is configured to capture video of a particular scene through the optical components 112 and the digital video image sensor 114 and to capture audio of the particular scene through the microphone 106. The digital viewfinder 118 displays an image of the scene being captured while the corresponding video and audio data is being recorded. When in playback mode, the HHD 100 is configured to "play" digital videos (comprised of captured video and audio data) that are stored in the internal memory 138. The video data is displayed on the digital viewfinder 118, and the audio data is output through the speaker 104. In alternative embodiments, the digital video and audio data may be output to the TV or to a computer system for playback.

The status indicators 108 visually indicate the current mode of operation of the HHD 100. The status indicators 108 include light emitting diodes (LEDs) that can be "ON," blinking, or "OFF," depending on the current operating mode of the HHD 100. The operating modes of the HHD 100 include, among others, the record mode and the playback mode.

The interface buttons 120 may include mechanical buttons, such as a power button 122 and a record button 124. In a preferred embodiment, the other interface buttons, including a left button 126, a right button 134, a increase button 120, a decrease button 136, a play/pause button 132, and a delete button 130 are implemented as capacitive-touch buttons. In alternative embodiments, these other interface buttons may be implemented as induction buttons, analog-resistive buttons, or any other technically feasible button type that can be engaged by the user in an electrically conductive manner.

The CPU 116 communicates with the various components within the HHD 100 to control the operations of the HHD 100. The CPU may be implemented as a single chip or as a combination of multiple chips. The CPU 116 also processes inputs from the interface buttons 120. For example, when the HHD 100 is in record mode, the CPU 116 transmits the digital video data received from the digital video image sensor 114 to the digital viewfinder 118 for display. Similarly, the CPU 116 may transmit the recorded audio and video data to the internal memory 138 for storage. The recorded audio and video data may be stored as separately or together as part of a composite video file. The internal memory 138 also stores firmware that is executed by the CPU 116 to control the operations of the HHD 100.

The internal memory 138 comprises either volatile memory, such as dynamic random access memory (DRAM), or non-volatile memory, such as a hard disk or a flash memory module, or a combination of both volatile and non-volatile memory. The internal memory 138 also stores a software driver 140 implemented as a set of program instructions configured to coordinate operation between the interface buttons 120 and the other components of the HHD 100.

The power supply 110 provides power to the HHD 100. The power may be provided by a battery or an external power source (e.g., an AC outlet). In one embodiment, the battery is a rechargeable battery that may or may not be removable from the HHD 100.

FIG. 2A is an isometric view of the HHD 100 of FIG. 1, according to one embodiment of the invention. As shown, the HHD 100 includes a front side 202, the data connector 102, a catch mechanism 240, the microphone 106, optical components 112, and a connector release 236. The data connector 102 may be in an extended position, as shown in FIG. 2A, or may be in a retracted position and contained within the HHD 100. When the data connector 102 is extended, the catch mechanism 240 is in an open state, as shown in FIG. 2A. FIG. 2B is a front view of the HHD 100, according to one embodiment of the invention. This view of the HHD 100 includes several of the components illustrated in FIG. 2A, including the front side 202, the microphone 106, and the optical components 112.

FIG. 2C is a back view of the HHD 100, according to one embodiment of the invention. A shown, the HHD 100 includes a back side 204, speakers 104, the digital viewfinder 118, the record button 124, as well as the set of capacitive-touch (CT) buttons 126, 128, 130, 132, 134, 136 embedded within the back side 204. The CT buttons include the left button 126, the right button 134, the increase button 128, the decrease button 136, the play/pause button 132, and the delete button 130.

In one embodiment, the record button 124, the play/pause button 132, and the delete button 130, collectively, may be considered the "primary" interface buttons 120; whereas, the remaining interface buttons 120 may be considered "secondary." The secondary interface buttons 120 are "flat" CT buttons that lie in the same plane as the back side 204 of the HHD 110. By contrast, the primary interface buttons 120 may be slightly recessed from back side 204 of the HHD 110 (and/or concave relative to the back side 204 of the HHD 100) so that, for example, the user can easily locate and use these buttons in a low-light situation (e.g., in the dark) or without looking at the back of the HHD 110.

FIG. 2D is a left-side view of the HHD 100, according to one embodiment of the invention. As shown, the HHD 100 includes a left side 210 that includes the power button 122 that is used to power the HHD 100 on and off. FIG. 2E is a right-side view of the HHD 100, according to one embodiment of the invention. As shown, the HHD 100 includes a right side 212 that includes a connector release 236 and a TV out port 238. The connector release 236 is used to release the data connector 120 into an extended position. For example, in one embodiment, the data connector 120 is spring-loaded such that when the user presses the data connector release 236 downwards, the data connector 102 is released into the extended position. The TV out port 238 is used to connect the HHD 110 to a TV with a cable (not shown) to allow composite video files stored in the HHD 100 to be displayed on the TV. In some embodiments, the TV out port 238 is implemented as a HDMI port or any other technically feasible type of output port.

FIG. 2F is a top view of the HHD 100, according to one embodiment of the invention. As shown, the HHD 100 has a top side 206 that includes one side of the data connector 102 and one side of the catch mechanism 240. When the data connector 102 is retracted, the catch mechanism 240 conceals the male portion of the data connector 102 (i.e., the portion of the data connector 102 that actually plugs into the TV or the computer system), thereby maintaining the sleek look and feel of the HHD 100.

FIG. 2G is a bottom view of the HHD 100, according to one embodiment of the invention. As shown, the HHD 100 has a bottom side 208 that includes a tripod mount 232, which enables the HHD 100 to be mounted on a standard tripod so that a user may capture video and audio footage without actually holding the HHD 100. A reset button 234, which is accessible using a pin or other slender implement, may be located within the tripod mount 232. The user may press the reset button 234 to perform a "hard reset" of the HHD 100 that may restore the original factory settings of the HHD 100.

Figure 3A:
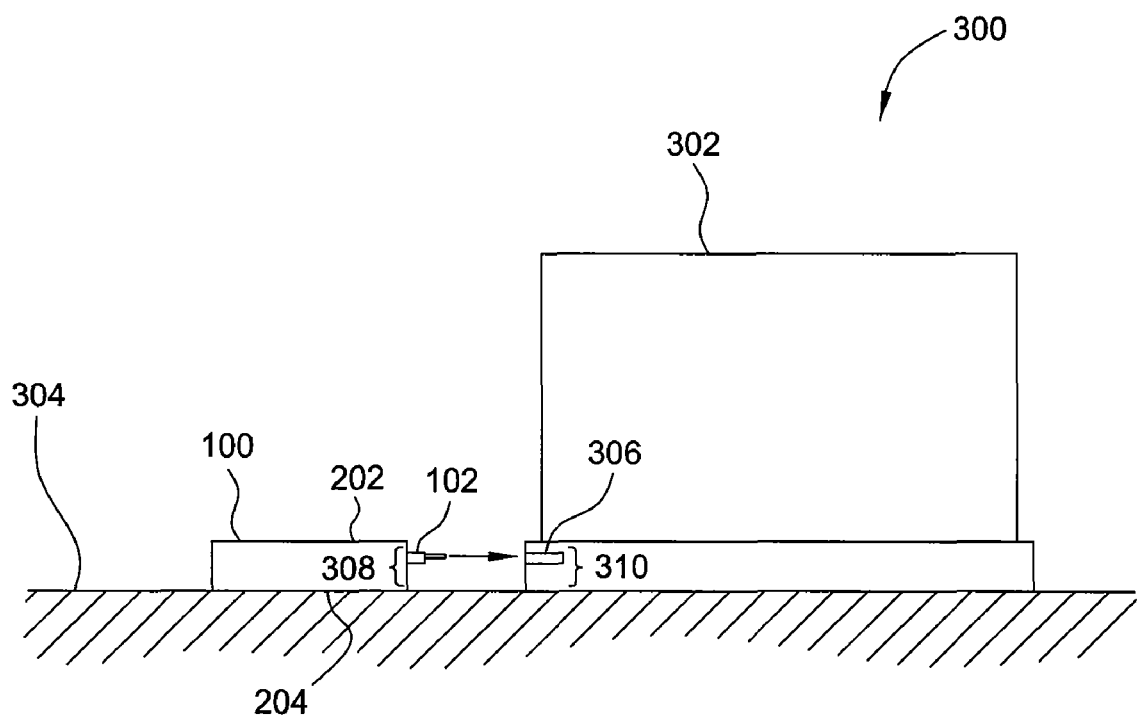
FIGS. 3A-3B are conceptual illustrations of how the hand-held device of FIGS. 2A-2G may be coupled to a laptop computer, according to one embodiment of the invention.

FIG. 3A is a conceptual illustration of how the HHD 100 of FIGS. 2A-2G may be coupled to a laptop computer 302, according to one embodiment of the invention. As shown, both the HHD 100 and the laptop computer 302 are resting on a flat surface 304. The HHD 100 is oriented on the flat surface 304 so that the back side 204 is in direct contact with the flat surface 304, and the front side 202 is facing away from the flat surface 304. When oriented in this manner, the HHD 100 is highly stable and is not prone to toppling or tipping.

The data connector 102 is extended from the HHD 100 and is directed towards a data port 306 included in the laptop computer 302. The data port 306 may be a universal serial bus (USB) port, a firewire port, a serial port or another type of port that is capable of receiving the data connector 102. The data port 306 is elevated from the flat surface 304 by a vertical distance 310. Conveniently, the data connector 102 is positioned relative to the HHD 100 so that when the HHD 100 is oriented, as shown, the data connector 102 is elevated from the flat surface 304 by a vertical distance 308, which is substantially equal to vertical distance 310. The data connector 102 may then be inserted into the data port 306 by simply sliding the HHD 100 across the flat surface 304 towards the laptop computer 302. The positioning of the data connector 102 relative to the data port 306 provides a simple and stable way to connect the data connector 102 to the data port 306 of the laptop computer 302, providing a more robust connection relative to conventional approaches.

Figure 3B:
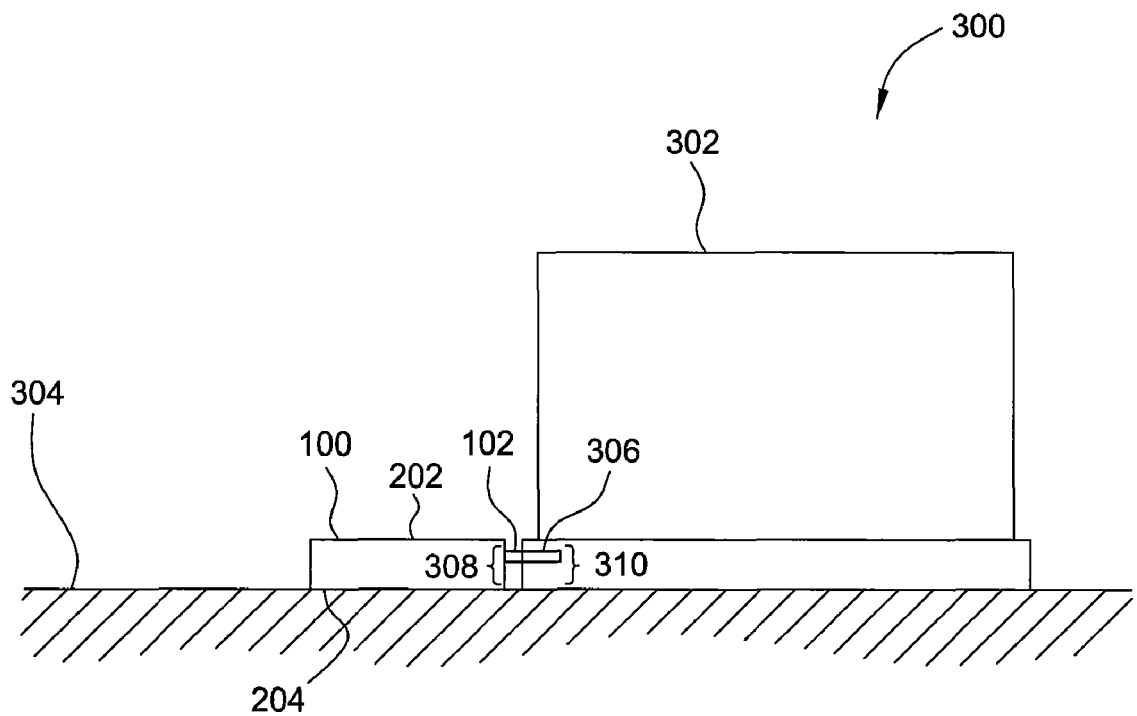

FIG. 3B shows the data connector 102 of the HHD 100 inserted into the data port 306 of the laptop computer 302. As described above in FIG. 3A, the data connector 102 is elevated from the flat surface 304 by a vertical distance 308, which is substantially equal to the vertical distance 310 between the data port 306 and the flat surface 304. When the HHD 100 is coupled with the laptop computer 302, as shown, the connection between the data connector 102 and the data port 306 is highly stable because the HHD 100 is resting on the back side 204 and is not prone to being displaced or toppled. Additionally, the position of the data connector 102 relative to the data port 306 substantially reduces or eliminates torque-related stresses that may be placed on either the data connector 102 and/or the data port 306 because the weight of the HHD 100 is not being supported by the data connector 102. Also, in the configuration shown, the data connector 102 is relatively close to the flat surface 304. Consequently, relative to prior art HHDs that are larger and/or thicker than the HHD 100, the data connector 102 can be connected more easily to laptops and other computers having standard USB data port configurations.

In other embodiments, as set forth below, the data connector 102 may be oriented such that the HHD 100 lies on either the left side 210 or the right side 212 when coupled to the laptop computer 302 via the data connector 102. Again, such a configuration provides a stable and robust connection between the HHD 100 and the laptop computer 302 since, among other things, the torque-related stresses placed on the data connector 102 and/or the data port 306 are reduced.

Figure 4A:
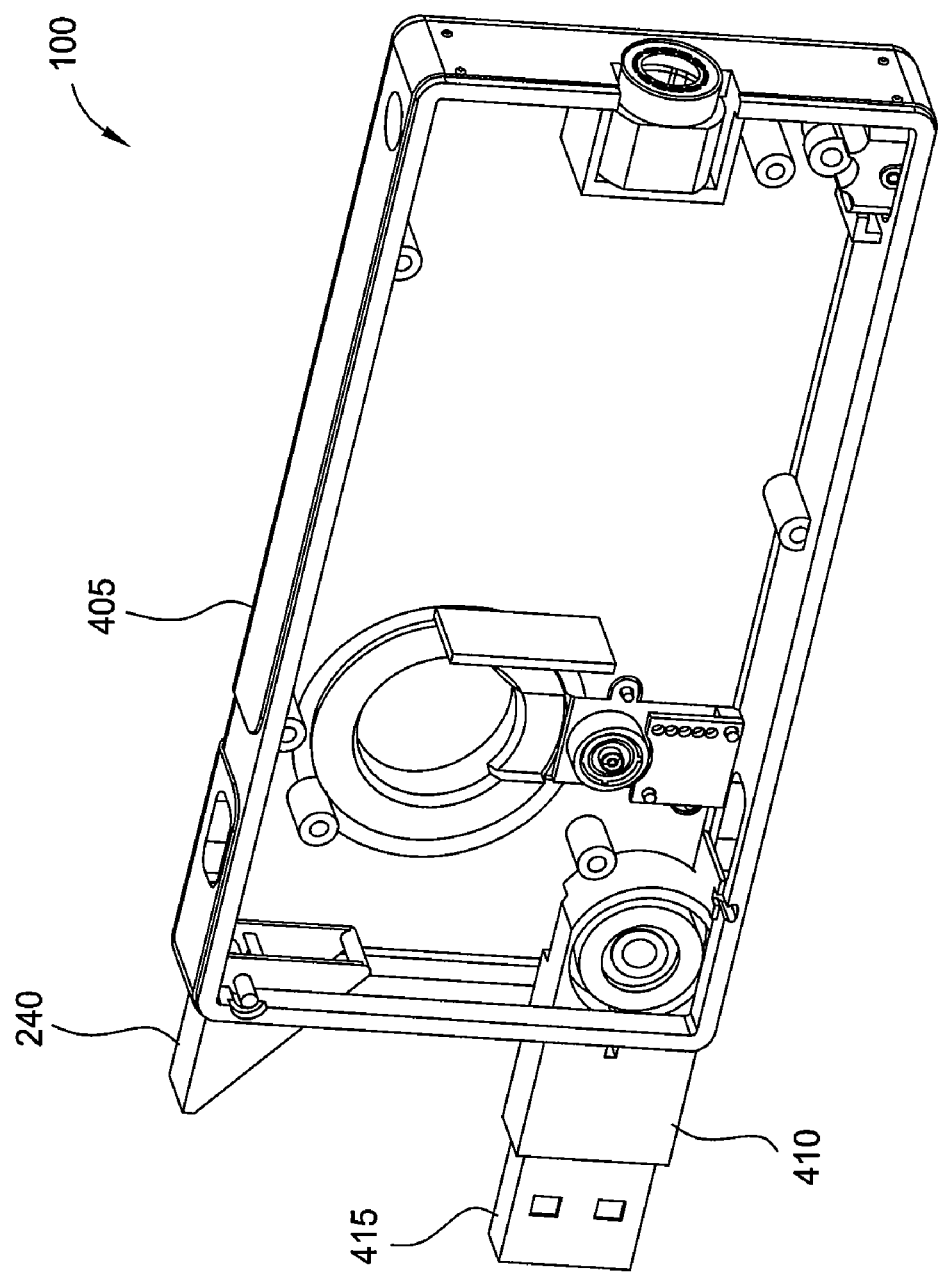
FIGS. 4A and 4B are isometric views of an inside of a housing of the HHD, according to one embodiment of the invention.
Figure 4B:
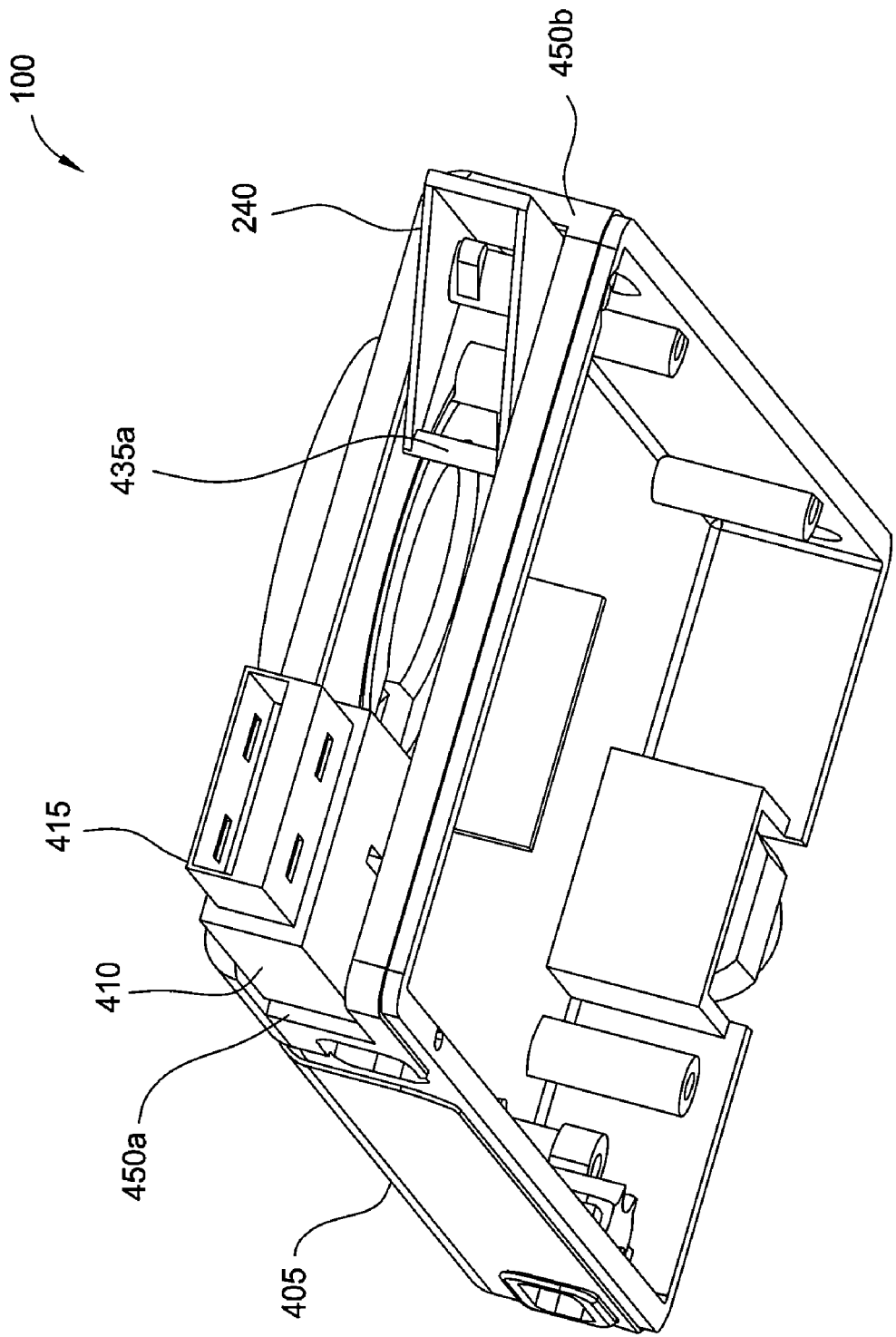
Figure 4C:
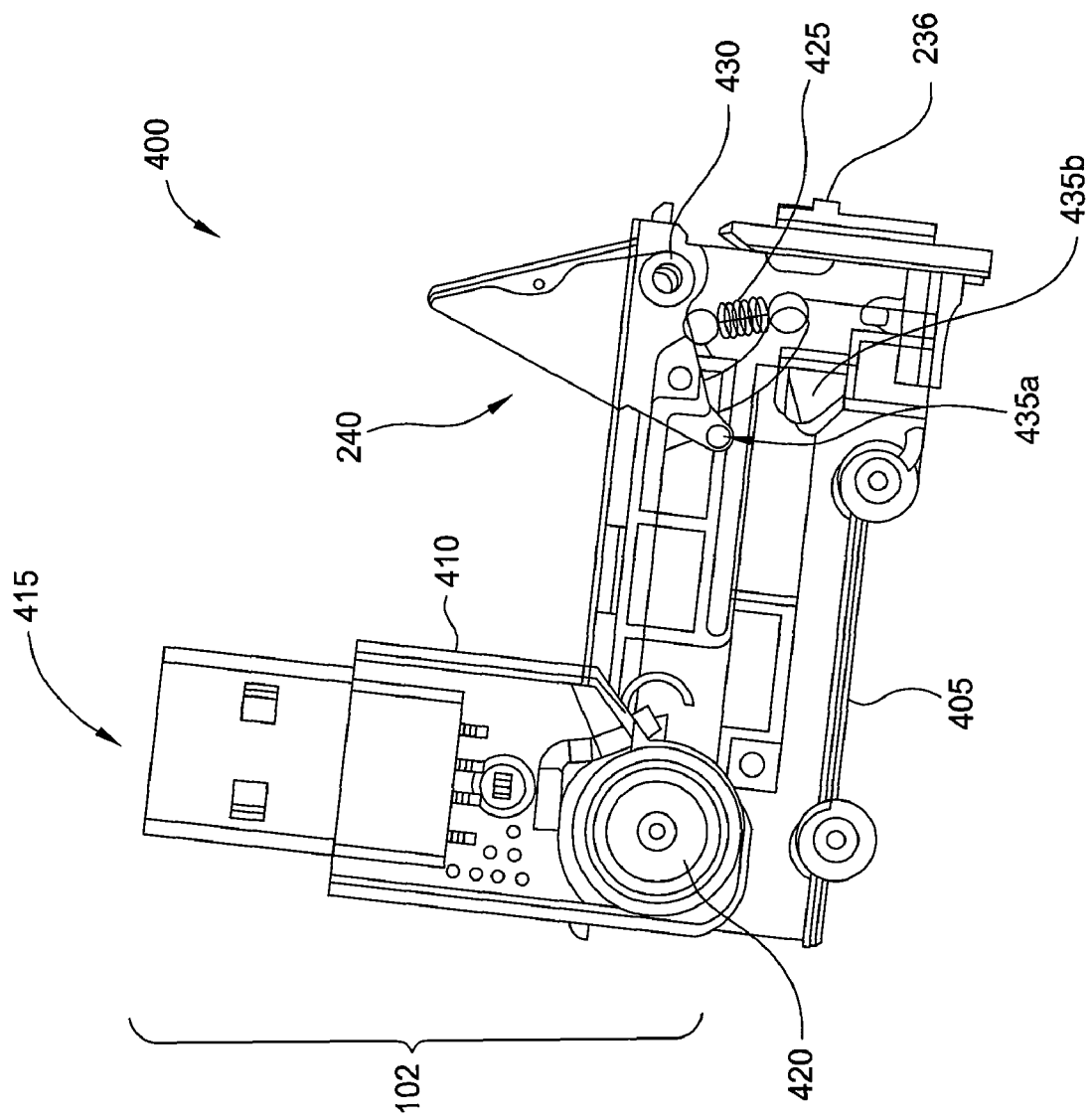
FIGS. 4C and 4D are rear and front views, respectively, of a data connector actuator, according to one embodiment of the invention.
Figure 4D:
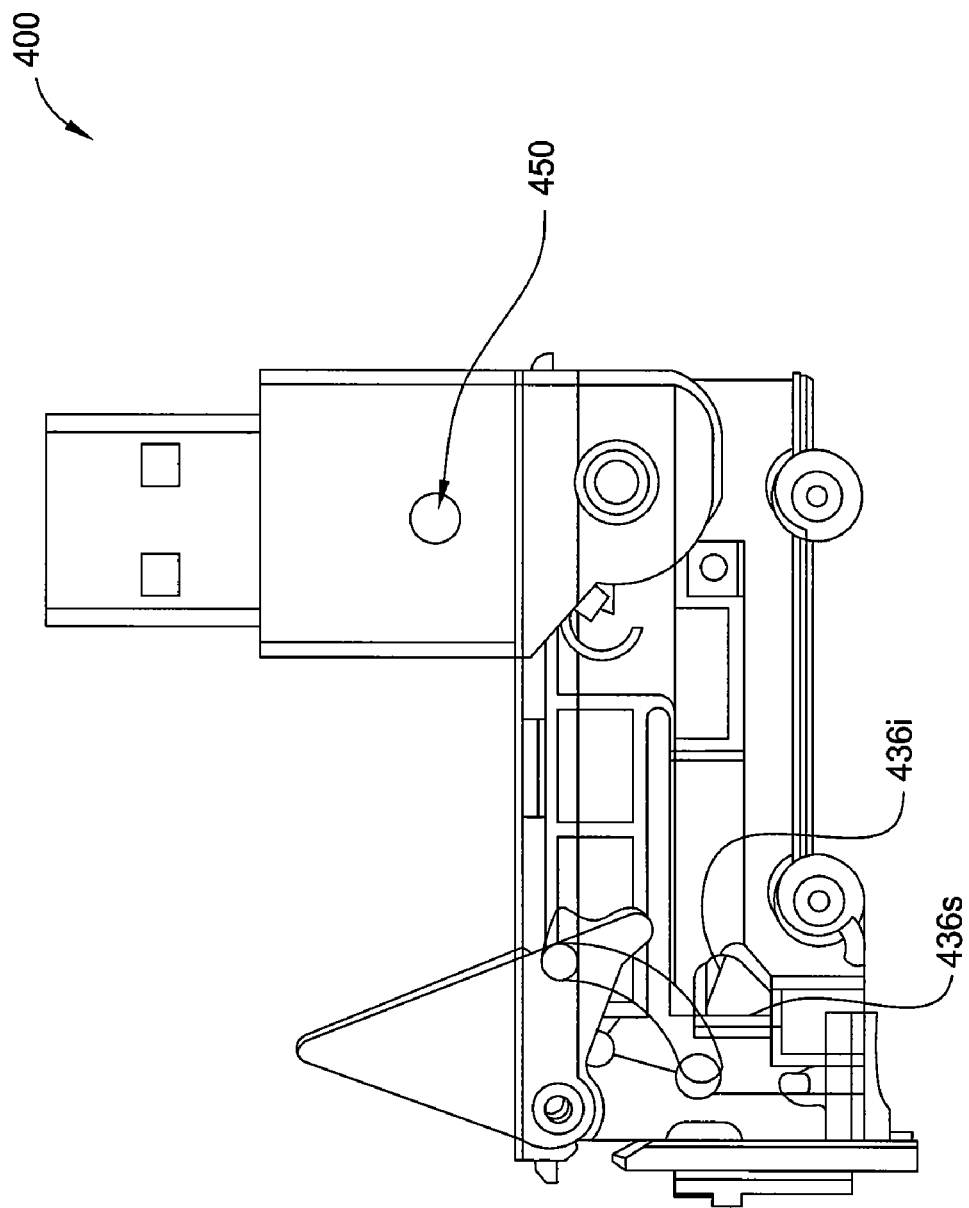

FIGS. 4A and 4B are isometric views of an inside of a housing 405 of the HHD 100, according to one embodiment of the invention. FIGS. 4C and 4D are rear and front views, respectively, of a data connector actuator 400, according to one embodiment of the invention. The data connector actuator 400 may include a portion of the housing 405, the data connector 102, the catch or door 240, the release or trigger 236, one or more biasing members 420, 425, 430, such as springs, and a latch 435 a,b.

The data connector 102 may include an arm 410 and an adapter portion 415, such as a USB connector, connected to the arm 410. The arm 410 may be pivoted to the housing 405. The biasing member 420, such as a torsion spring, may bias the arm 410 into the extended position. The longitudinal axis of the data connector 102 may be parallel to a longitudinal axis of the housing 402 in the extended position. The longitudinal axis of the data connector 102 may be perpendicular to the longitudinal axis of the housing 402 in the retracted position. A surface 450a of the housing 405 may serve as a stop for the arm 410 in the extended position.

The catch 240 may also be pivoted to the housing 405. The biasing member 430, such as a torsion spring, may bias the catch 240 toward an open position. A top of the catch 240 may be more or less perpendicular to a top of the housing 405 in the open position. A surface 450b of the housing 402 may serve as a stop for the catch 240 in the extended position. The catch 240 may be a triangular prism having a hollow interior for receiving the adapter portion 415 in the retracted position. The catch 240 may have an open hypotenuse, an open right side, and a closed top for interaction with the data connector 102. The catch 240 may include a first portion 435a of the latch, such as a pin or bolt, connected to the catch 240 at or near a corner thereof.

The trigger 236 may be laterally coupled to the housing 405 so that the trigger 236 is longitudinally movable relative to the housing. The trigger 236 may be connected with or formed integrally with a second portion 435b of the latch, such as a retainer. The retainer 435b may include an inclined surface 436i and a straight surface 436s. The inclined surface 436i may face the pin 435a when the catch 240 is in an open position and the straight surface 436s may face the pin 435a when the catch 240 is in a closed position. The biasing member 425, such as a coil spring, may be connected to the housing and the trigger/retainer, thereby biasing the retainer 435b upward, or toward the pin 435a, into a latched position.

In operation, starting from the extended position of the data connector 102, a user may push the arm 410 toward the catch 240, thereby overcoming the bias of the torsion spring 420. The user may use a hand, a finger, or a thumb. The user may continue pushing until the adapter portion 415 enters the catch 240 and engages the pin 435a, thereby rotationally coupling the data connector 102 and the catch 240. The user may continue pushing, thereby also overcoming the bias of the torsion spring 430 and rotating the pin 435a toward the retainer 435b. The user may continue pushing until the pin engages the inclined surface 436i of the retainer 435b, thereby pushing the retainer 435b and the trigger 236 downward, or away from the pin 435a, and overcoming the bias of the coil spring 425. The user may continue pushing until the pin 435a passes the retainer 435b, thereby disengaging the pin 435a from the retainer 435b and allowing the retainer 435b to be pulled upward by the coil spring 425 so that the straight surface 436s engages the pin 435a and latches the catch 240 in the closed position. Rotation of the catch 240 toward the closed position may move the closed catch top over the adapter portion 415, thereby retaining the adapter portion 415 and the arm 410 in the retracted position and concealing view of the adapter portion 415.

To move the data connector to the extended position, a user may operate the trigger 236 using a digit, such as a finger or thumb. The user may move the trigger downward, thereby overcoming the bias of the coil spring 425 and moving the retainer 435b downward, thereby releasing the pin 435a and the catch 240. The torsion spring 430 may then rotate the catch 240 toward the open position while the torsion spring 420 rotates the data connector 102 toward the extended position. At some point during rotation, the adapter portion 415 may exit the catch 240. The connector 102 may continue rotation until the arm 410 engages the surface 450a and the catch 240 engages the surface 450b. The connector 102 may rotate a substantial distance between the extended and retracted positions, such as ninety degrees. The catch 240 may also rotate a substantial distance between the open and closed positions, such as sixty to ninety degrees. The catch 240 may be moved between the open and closed positions independently of the data connector 102 so that the catch 240 may be closed when the data connector is extended, thereby facilitating mating of the data connector 102 with a computing device, such as laptop 302.

The arm 410 may include a visual indicator, such as an integrated light emitting diode (LED) 450 to provide the user with an indication of the connection/charge status. The LED 450 may indicate when the HHD 100 is connected and charging and may further indicate the charge status. For example, the LED 450 may blink when a connection is made to a charging device, such as a wall outlet or a USB port, and may be continuously lit when the HHD 100 is fully charged.

Figure 4E:
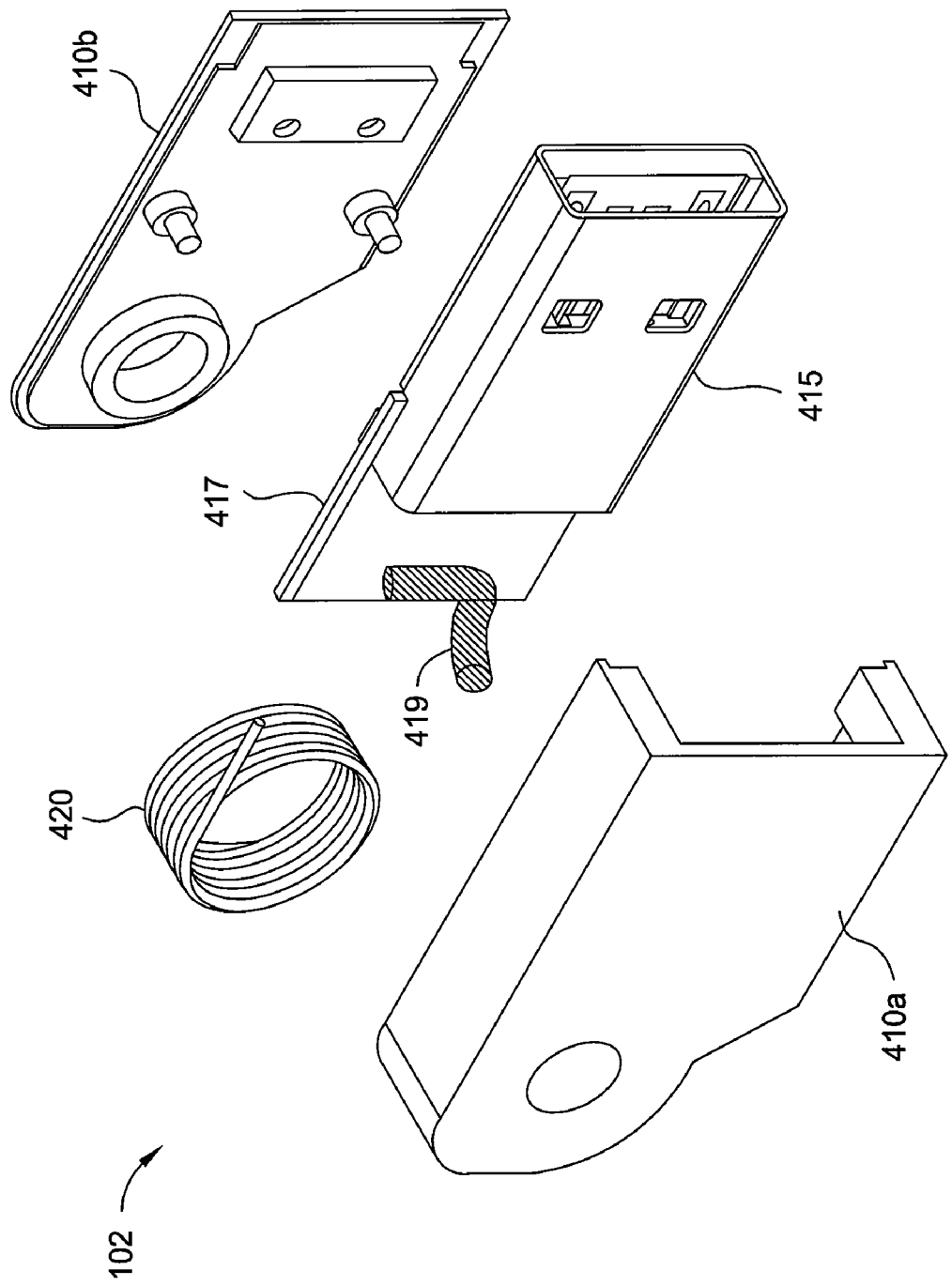
FIG. 4E is an exploded assembly of the data connector, according to one embodiment of the invention.

FIG. 4E is an exploded assembly of the data connector 102, according to one embodiment of the invention. The data connector 102 may further include a printed circuit board (PCB) 417, a data conduit 419, and an arm lid 410a and base 410b. The adapter portion 415 may be a USB Type A or B, USB mini-A or B, or USB micro-A or B. The adapter portion 415 may be mounted to the PCB 417. The arm lid 410a and base 410b may encase a portion of the PCB 417 and adapter portion 415. The data conduit may be jacketed wires or flex cable and may extend from the PCB 417 to the central processing unit 102. The torsion spring 420 may be wrapped around a shaft extending from an inner surface of the arm base 410b.

Alternatively, the catch 240 may be retained in the open position by a friction latch, such as a ball detent, instead of the torsion spring 430. In another alternative, the catch 240 may be a U-shaped member and may conceal a portion of a right side of the housing 405 in the closed position in addition to covering the adapter portion 415. Additionally, the actuator may further include a damper operable to control speed of rotation of the data connector 102 and/or the catch 240. Alternatively, the adapter portion 415 may be pivoted relative to the arm 410, thereby accounting for different orientations of the data port of the computer system to which the data connector 102 is coupled. The pivot may allow for one-axis rotation, such as a swivel (longitudinal) or a hinge (transverse), two-axis rotation, such as a universal joint, or three-axis rotation, such as a ball and socket connection. Various embodiments of the invention also contemplate that the arm and adapter portion may have any technically feasible number of degrees of freedom.

Figure 5B:
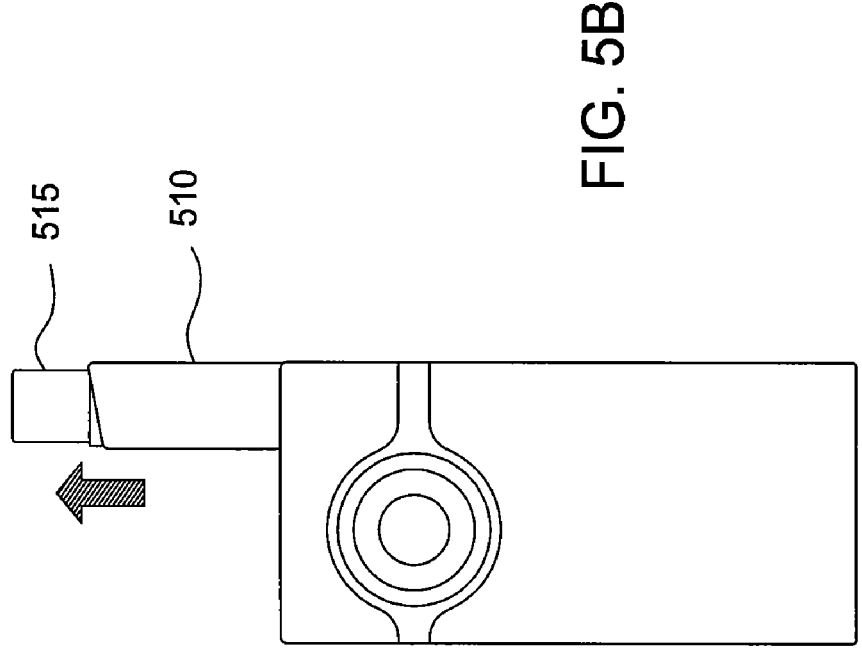
FIGS. 5A and 5B are front views of a hand-held device including a data connector actuator in a first extended stage and a second extended stage, respectively, according to one embodiment of the invention.
Figure 5A:
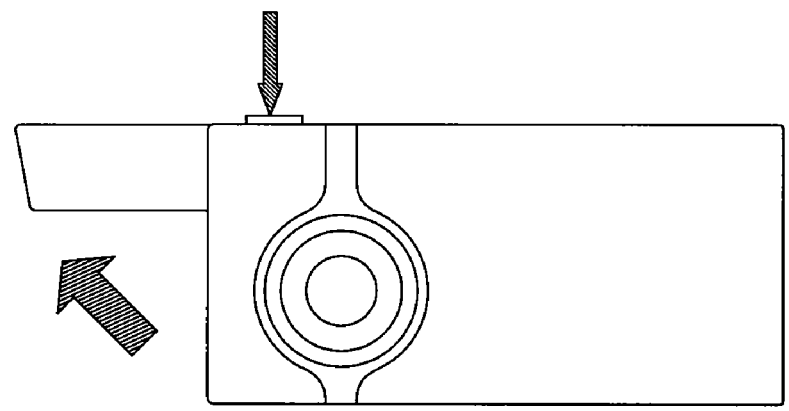

FIGS. 5A and 5B are front views of an HHD including a data connector actuator 500 in a first extended stage and a second extended stage, respectively, according to one embodiment of the invention. The adapter portion 515 may reciprocate relative to the arm 510. The arm 510 may extend the width of the housing 505, thereby eliminating need for the catch 240. The adapter portion 515 may or may not be spring-biased toward the second extended position. The adapter portion 515 may be latched in the second extended position. The adapter portion 515 may be retracted from the second extended position by an actuator (not shown) connected to the adapter portion 515 and operable by a thumb or finger of a user.

Persons skilled in the art will recognize that the embodiments of the data connector actuator in FIGS. 4A-5B and FIGS. 7A-8 are not limited to extending from the top portion of the HHD. The principles articulated herein apply with equal force to embodiments where the arm and adapter portion of the data connector actuator extend from the bottom portion of the HHD.

Figure 6B:
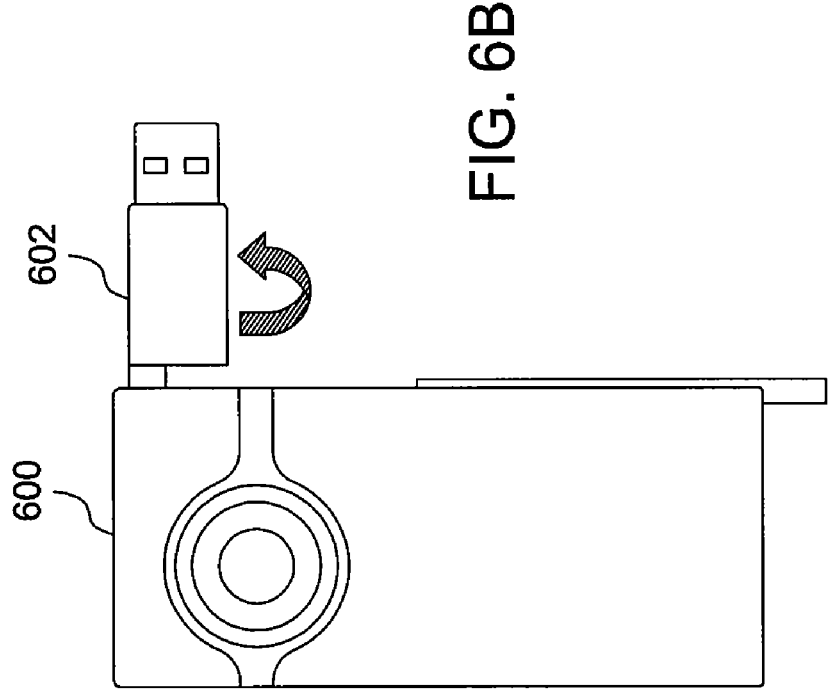
FIGS. 6A and 6B illustrate various ways the data connector of a hand-held device may be manipulated while in an extended position, according to an alternative embodiment of the invention.
Figure 6A:
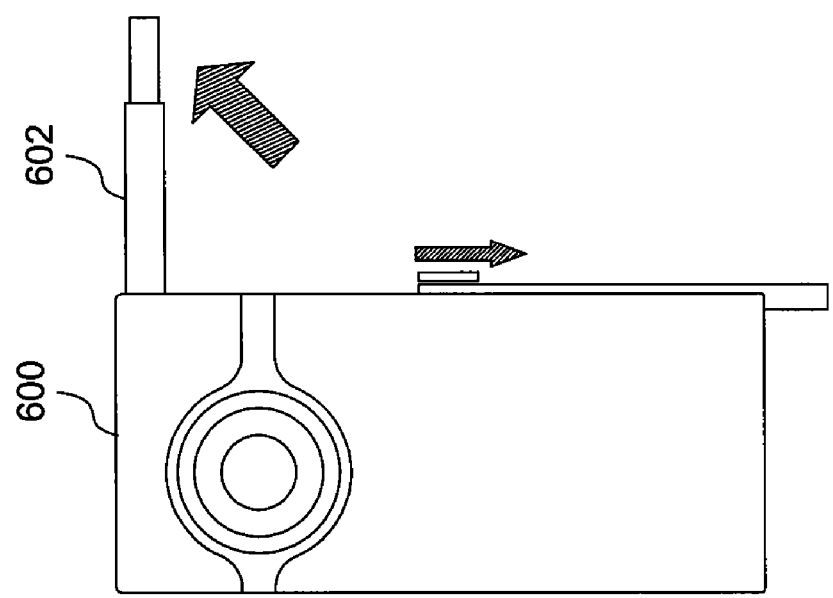

FIGS. 6A and 6B illustrate various ways a data connector 602 of an HHD 600 may be manipulated while in an extended position, according to an alternative embodiment of the invention. As shown, while extended, the data connector 602 may be rotated about the axis through which the data connector 602 is connected to the HHD 600, providing the data connector 602 with one degree of freedom. In other embodiments, the data connector 602 can have any number of technically feasible degrees of freedom while in the extended position. For example, FIGS. 7A-7E illustrate different designs for a data connector 700, each of which provides for one or more degrees of freedom when the data connector 700 is in the extended position.

In all such embodiments, the data connector 602 or 700, as the case may be, may extend from the top portion, bottom portion, right side or left side of the HHD 600. The HHD 600 may include an actuation means that causes the data connector 602 or 700 to move into the extended position, or the data connector 602 or 700 may be manually extended. In these various embodiments, there may or may not be a catch mechanism, like the catch mechanism 240, that overlaps the data connector 602 or 700 when in the retracted position. Further, when retracted, the adapter portion of the data connector 602 or 700 may be visible or exposed, not being fully covered or covered at all by a catch mechanism or other element of the HHD 600. Similarly, when retracted, the data connector 602 or 700 may not be flush with the surface of the HHD 600 from which the data connector 602 or 700 extends. In addition, in different embodiments, there may or may not be a spring force or other means biasing the data connector 602 or 700 towards the HHD 600 when in the extended position.

Figure 8:
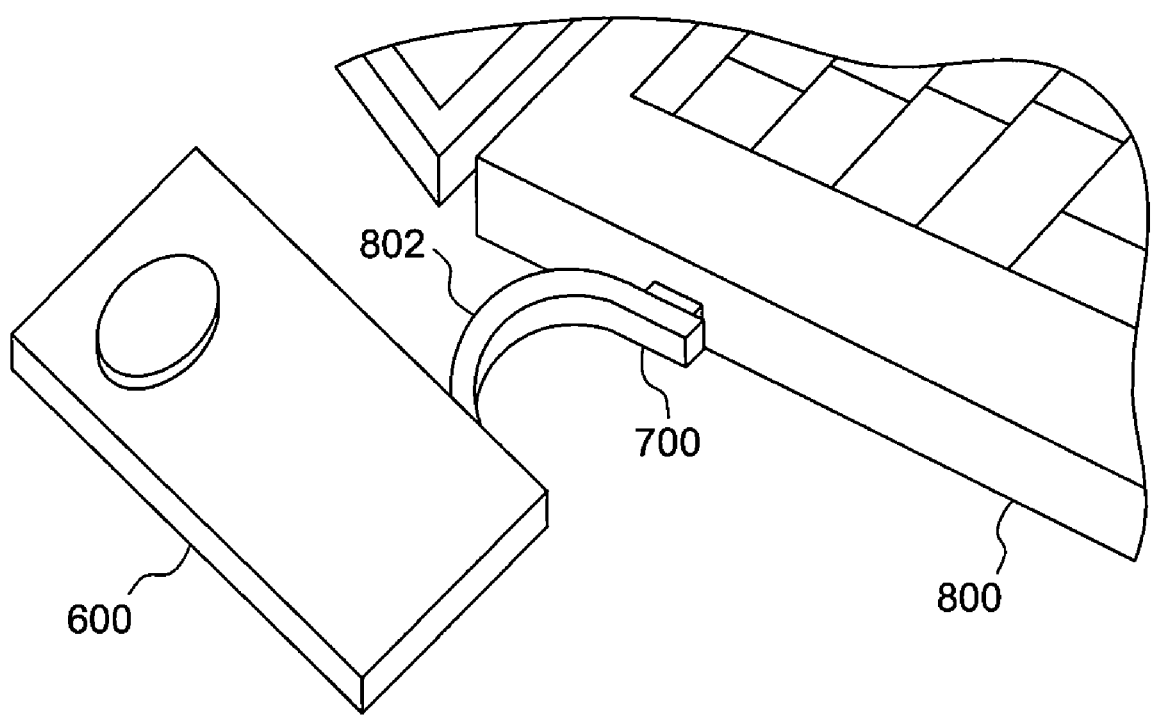
FIG. 8, illustrates how the data connector of a hand-held device may be connected to a computer system, according to one alternative embodiment of the invention.

FIG. 8, illustrates how the data connector 700 of FIG. 7B may be connected to a computer system 800, according to one alternative embodiment of the invention. As shown, the data connector 700 includes a flexible portion 802 having an internal spring force that biases the data connector 700 towards the HHD 600 when the data connector is in the extended position. Here, the user would manually extend the data connector into the extended position and connect the data connector 700 to the corresponding port within the computer system 800. However, any type of automated means for extending the data connector 700 into the extended position shown would also fall within the scope of the invention. The HHD 600 may include a magnet or other mechanism (not shown) that secures the data connector 700 when placed into a retracted position.

One advantage of certain embodiments described herein is that locating the data connector at the top of the HHD enables the HHD to be connected to a computer system in a more user-friendly fashion relative to prior art designs, where the data connector is typically at the side of the HHD. For example, with a prior art HHD having a data connector located at the side, when a user slides the trigger that releases the data connector from a retracted position into an extended position, the user's hand normally interferes with the release of the data connector. The user is therefore required to hold the device at a clumsy and uncomfortable position in order for the data connector to release properly into the extended position without hitting the user's hand. Alternatively, with a side-release data connector design, the user could hold the HHD with two hands, with one hand steadying the device and the other hand activating the trigger that releases the data connector. However, holding the device in such a fashion with two hands, can be even more awkward than the one-handed approach. Additionally, with a side-release data connector design, the process of plugging the data connector into a computer system is also cumbersome. Because the data connector extends sideways relative to the user after being released (and not away from the user), the user must either rotate the device or twist his/her hand awkwardly to plug the data connector into the computer system.

In contrast, with certain disclosed embodiments, the user can easily, with one hand, hold the HHD and slide the trigger with a thumb or other finger to release the data connector into the extended position. Because the data connector is designed to extend from the top portion of the HHD (and not from the side), the user's hand does not interfere with the release of the data connector. Further, since the data connector extends from the top of the HHD, the user can easily slide the extended data connector into a corresponding port on a computer system without having to rotate the device awkwardly in his/her hand or contort his/her hand to align the data connector with the computer system port. These features of the disclosed system simplify how the HHD is connected to the computer system, thereby enhancing the overall user experience.

Another advantage is that the data connector allows the HHD to be directly connected to a corresponding data port within a computer system without the need for an intervening cable, thereby enhancing portability of the HHD. Further, since the HHD lies flat when connected to the computer system, the data connector is not required to support the weight of the HHD when connected to the computer system. Such a configuration substantially reduces damaging stresses placed on the data connector that result from prior art connection techniques. Finally, since the HHD is in a stable orientation when connected to the computer system, the connection is quite robust, thereby decreasing the likelihood that data transfers between the HHD and the computer system will be disrupted.

Yet another advantage is that certain disclosed embodiments provide the user with greater flexibility and more options when coupling the HHD to the data port within the computer system relative to prior art designs. As a result of design constraints with many prior art approaches, the user cannot couple the data connector to the data port because of lack of space, interference with other components of the computer system, and/or interference with other components of the device itself. In contrast, various embodiments of the invention, which contemplate the arm and/or the adapter portion having any technically feasible number of degrees of freedom, allow the data connector to be coupled to the computer system in a greater number of positions and orientations of the data port of the computer system.

Additionally, certain disclosed embodiments allow the data connector to bend or move without putting damaging stress on the data connector. For example, in a situation where the data port of the computer system is elevated, by several inches, from a flat surface on which the computer system is resting, the data connector located at the top side of the HHD could bend or move to couple the HHD to the data port, while the bottom side of the HHD rests on the flat surface, thereby minimizing the stress placed on the data connector.

We claim:

1. A hand-held electronics device for recording digital video, comprising:
    a housing;
    a processor disposed within the housing;
    an actuation mechanism that includes:
        a catch rotationally coupled to the housing and movable between an open position and a closed position,
        a latch mechanism operable to retain the catch in the closed position, wherein the latch mechanism comprises a pin connected to the catch, a trigger mechanism coupled to the housing, and a retainer formed integrally with or connected to the trigger mechanism, and
        a first spring; and
    a data connector coupled to the processor such that data can be transmitted to and from the processor through the data connector, the data connector including:
        an arm rotationally coupled to the housing, and
        an adapter portion matable with a corresponding adapter of a computer system,
        wherein the data connector forms a portion of a top part or a bottom part of the housing when in a retracted position
        wherein the actuation mechanism is operable to cause the data connector to rotate from the retracted position to an extended position
        wherein the first spring is operable to bias the data connector toward the extended position.

2. The hand-held electronics device of claim 1, wherein the adapter portion is concealed from view by the catch when the adaptor portion is in the retracted position and the catch is in the closed position.

3. The hand-held electronics device of claim 1, wherein the retainer comprises:
    an inclined surface operable to engage the pin and to move the retainer away from the pin; and
    a straight surface operable to retain the pin, wherein the latch mechanism further comprises a second spring operable to bias the straight surface into engagement with the pin.

4. The hand-held electronics device of claim 1, wherein the actuation mechanism further comprises a second spring operable to bias the catch toward the open position.

5. The hand-held electronics device of claim 1, wherein the adapter portion engages the catch when the data connector is rotated from the extended position to the retracted position, thereby rotationally coupling the data connector and the catch.

6. The hand-held electronics device of claim 1, wherein the adaptor portion comprises a Universal Serial Bus (USB) connector.

7. The hand-held electronics device of claim 1, wherein the housing is substantially rectangular having a length and a width, wherein the width of the housing substantially equals a length of the data connector.

8. The hand-held electronics device of claim 1, wherein a longitudinal axis of the data connector is parallel to a longitudinal axis of the housing when the data connector is in the extended position and perpendicular to the longitudinal axis of the housing when the data connector is in the retracted position.

9. The hand-held electronics device of claim 8, wherein the adapter portion is longitudinally movable relative to the arm between an extended position and a retracted position, and the adapter is enclosed within the arm in the retracted position.

10. The hand-held electronics device of claim 1, further comprising:
a lens;
a digital video image sensor in optical communication with the lens and in data communication with the processor; and
a microphone in data communication with the processor.

11. The hand-held electronics device of claim 1, further comprising a light emitting diode disposed on the arm and operable to indicate a connection with the computer system.

12. The hand-held electronics device of claim 1, wherein the data connector has one or more degrees of freedom when in the extended position in addition to a first degree of freedom arising from the arm being rotationally coupled to the housing.

13. An electronic device, comprising:
a housing;
a trigger mechanism disposed on a side of the housing;
a catch rotationally coupled to the housing and operable to rotate from a closed position to an open position in response to the trigger mechanism being engaged and displaced by a user of the electronic device;
a data connector operable to rotate from a retracted position to an extended position in response to the catch rotating to the open position, the data connector including:
an arm rotationally coupled to the housing, and
an adapter portion matable with a corresponding adapter of a computer system;
a first spring operable to bias the data connector toward the extended position,
a pin connected to the catch; and
a retainer formed integrally with or connected to the trigger mechanism, wherein a second spring is operable to bias a straight surface of the retainer into engagement with the pin when the catch enters the closed position,
wherein, the data connector extends from a top part or a bottom part of the housing when in the extended position and is disposed on a same side of the housing as the catch.

14. The electronic device of claim 13, wherein the catch conceals the adapter portion from view when the catch is in the closed position and the data connector is in the retracted position.

15. The electronic device of claim 14, wherein the catch protrudes from the top or the bottom of the housing when in the open position.

16. The electronic device of claim 13, wherein the adaptor portion comprises a Universal Serial Bus (USB) connector.

17. The electronic device of claim 13, wherein the electronic device comprises a digital video camera.

18. The electronic device of claim 13, wherein the trigger mechanism, when engaged and displaced by the user, causes the pin to disengage with the retainer, thereby allowing the first spring to rotate the data connector into the extended position.

19. The electronic device of claim 13, wherein data can be transmitted between the electronic device and a computer system through the data connector.

20. The electronic device of claim 13, wherein the data connector has one or more degrees of freedom when in the extended position in addition to a first degree of freedom arising from the arm being rotationally coupled to the housing.

* * * * *